United States Patent [19]

Moyer et al.

[11] Patent Number: 5,136,682
[45] Date of Patent: Aug. 4, 1992

[54] CURABLE COMPOSITIONS AND METHODS FOR USE IN FORMING OPTICAL WAVEGUIDE STRUCTURES

[75] Inventors: Wendell W. Moyer, Atherton; Patrick M. Martens, Pleasanton; Stephen F. Powell, Woodside, all of Calif.

[73] Assignee: Raychem Corporation, Menlo Park, Calif.

[21] Appl. No.: 686,057

[22] Filed: Apr. 15, 1991

[51] Int. Cl.$^5$ .................................................. G02B 6/00
[52] U.S. Cl. ..................................... 385/141; 427/162; 428/412
[58] Field of Search ................. 385/141; 427/162, 163, 427/400; 428/412

[56] References Cited

U.S. PATENT DOCUMENTS 4,844,955  7/1989  Graefe et al. .......................... 427/400
4,900,127  2/1990  Robello et al. ........................ 385/141

OTHER PUBLICATIONS

Franke and Crowe, "Optical Waveguiding in Polyimide" SPE vol. 651 Integrated Optical circuit Engineering III, 1986, pp. 102–107.
Selvaraj, Lin and McDonald, "Integrated Optical Waveguides in Polyimide for Wafer Scale Integration", IEEE Journal of Lightwave Technology, vol. 6, No. 6, Jun. 1988, pp. 1034–1044.
Kokubun, Baba and Iga, "Silicon Optical Printed Circuit Board for Three-Dimensional Integrated Optics", Electronics Letters, vol. 21, No. 11, (1985), pp. 508–509.
Hartman, Lalk, Howse and Krchnavek, "Radiant Cured Polymer Optical Waveguides on Printed Circuit Boards for Photonic Interconnection Use, Applied Optics," vol. 28, No. 1, Jan. 1989, pp. 40–47.
Sullivan and Husain, "Guided-wave Optical Interconnects for VLSI Systems", SPIE vol. 881 Optical Computing and Nonlinear Materials, 1988, pp. 172–176.
Sullivan, "Optical Waveguide Circuits for Printed Wire-Board Interconnections", SPIE vol. 994 Optoelectronics Materials, Devices, Packaging, and Interconnects II, (1988) pp. 92–100.
Grande, Braddock, Shealy and Tang, "One-Step Two-Level Etching Technique for Monolithic Integrated Optics", Applied Physics Letters, vol. 51, No. 26, Dec. 28, 1987, pp. 2189–2191.
Hartmann, Lalk Banwell and Ladany, "Board Level High Speed Photonic Interconnections: Recent Technology Developments", SPIE vol. 994 Optoelectronic Materials, Devices, Packaging and Interconnections II, (1988) pp. 57–64.
Hartman, "Digital High Speed Interconnects: A Study of the Optical Alternative", Optical Engineering, vol. 25, No. 10, (1986) pp. 1086–1102.
Lalk, Smith, Emmetts and Hartman, "Board Level High Speed Photonic Interconnections: Recent System Developments", Proc. SPIE Int. Soc. for Optical Engineering, vol. 1178, (1990) pp. 123–130.
Selvaraj, McDonald, Lin and Gupta, "Optical Interconnections Using Integrated Waveguides in Polyimide for Wafer Scale Integration", Proc. of V-MIC Conference, Santa Clara, (Jun. 1987), pp. 306–313.
Miura, Sawaki and Nakajima, "Low-loss Single-mode Plastic Waveguide Fabricated by Photopolymerization", Technical Digest, Topical Meeting on integrated and Guided Wave Optics, Int. Optics, Int. Optical Soc. (USA), Washington, DC, (1988) 58–61.

Primary Examiner—Akm E. Ullah
Attorney, Agent, or Firm—Yuan Chao; Herb Burkard

[57] ABSTRACT

The present invention provides polymerizable compositions which may be cured with ultraviolet light to form polymer compositions which are especially useful as channel optical waveguides. In particular, they exhibit stability at elevated temperatures such as occur in, for example, reflow soldering.

17 Claims, 8 Drawing Sheets

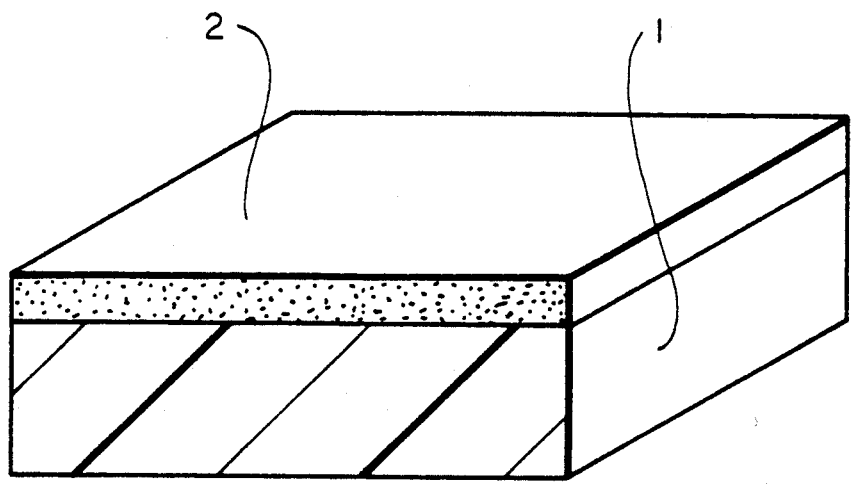
FIG_1
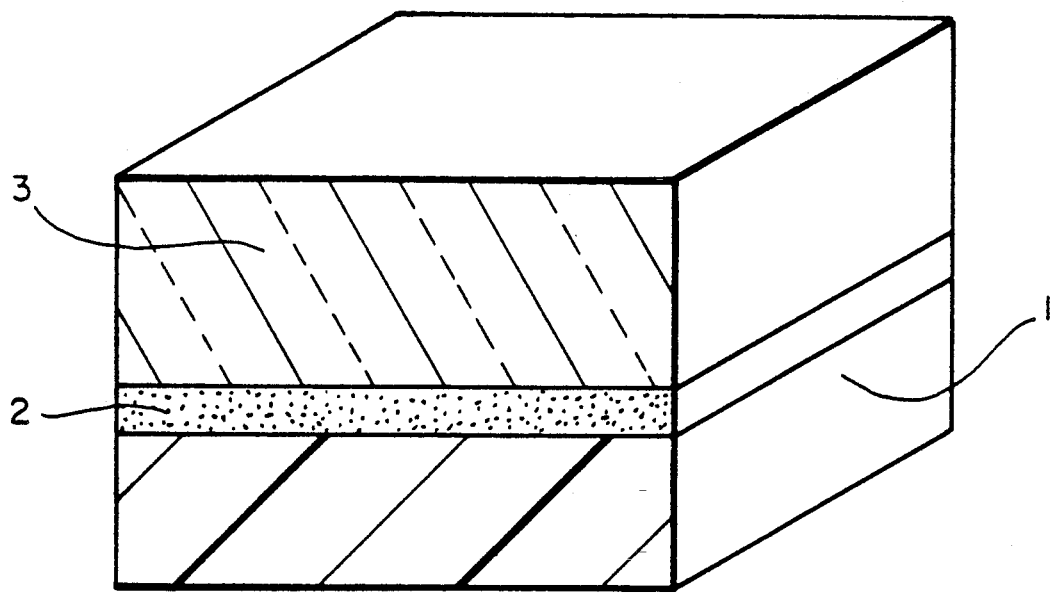
FIG_2

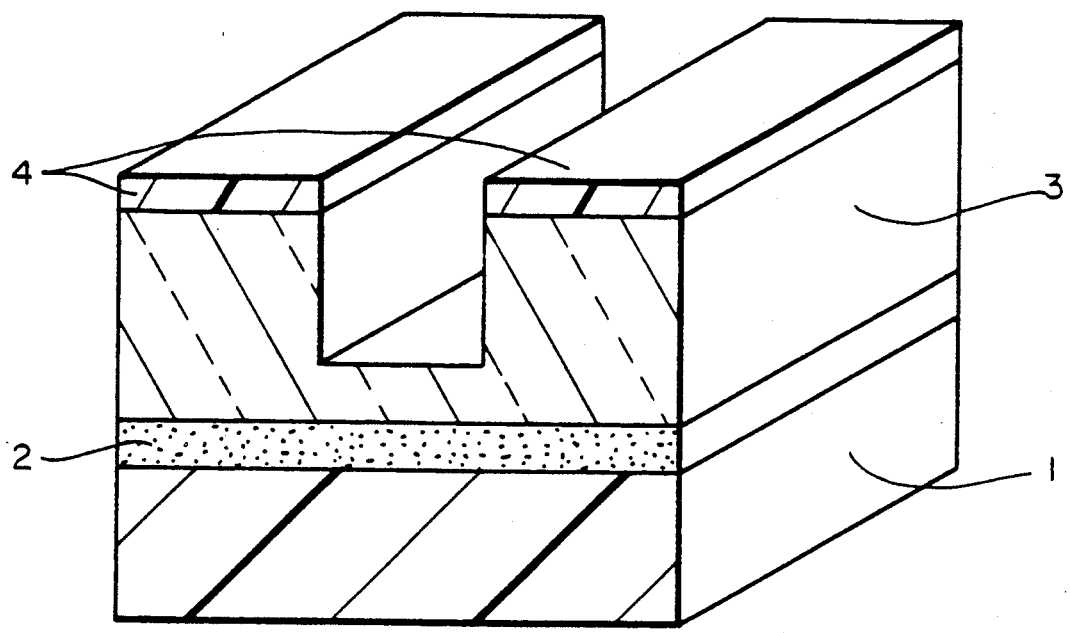
FIG_3
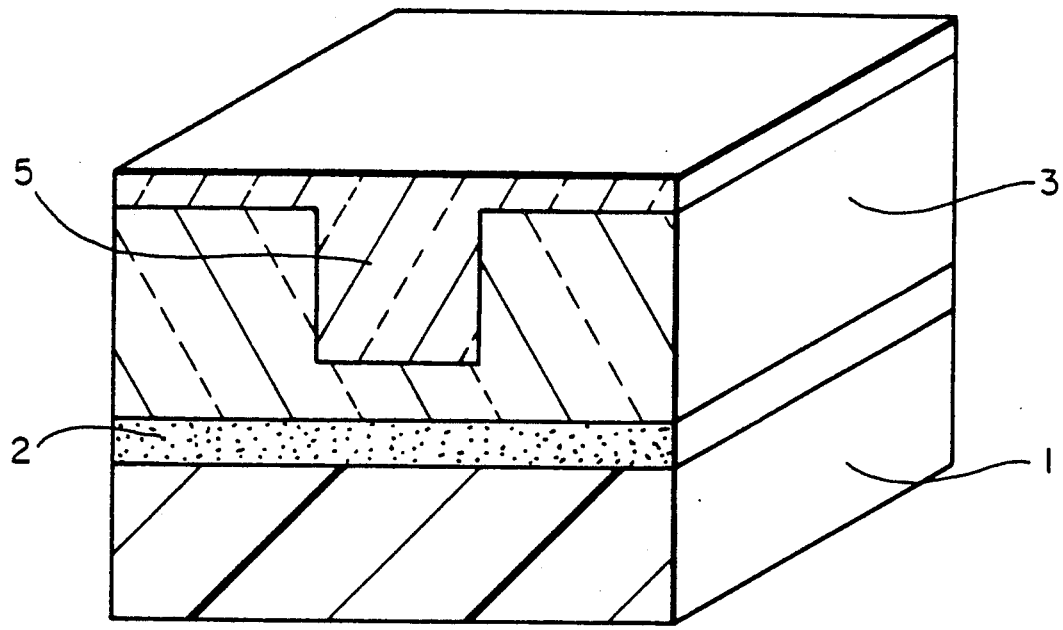
FIG_4

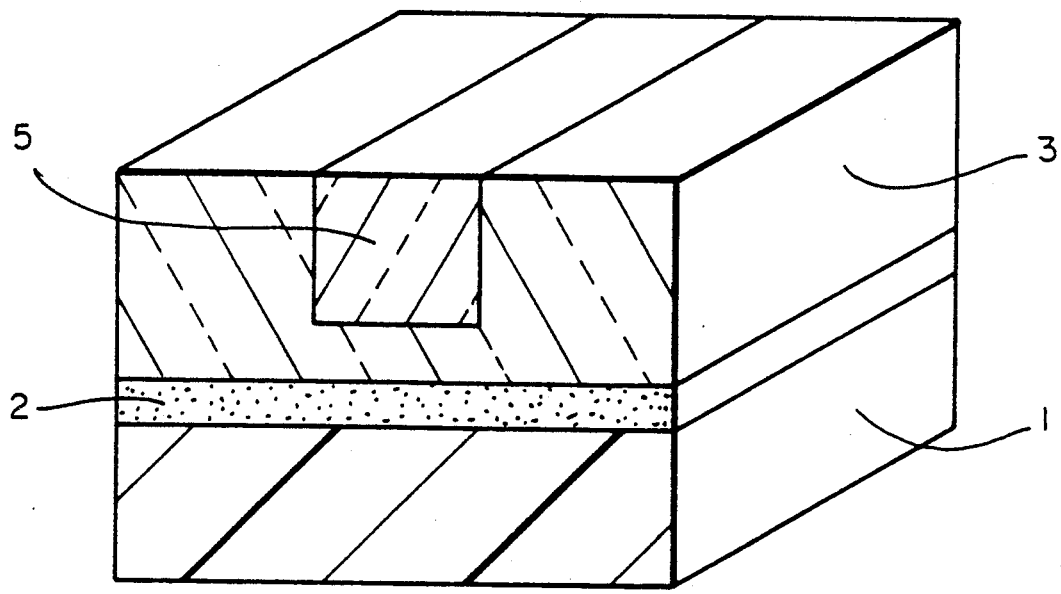
FIG_5
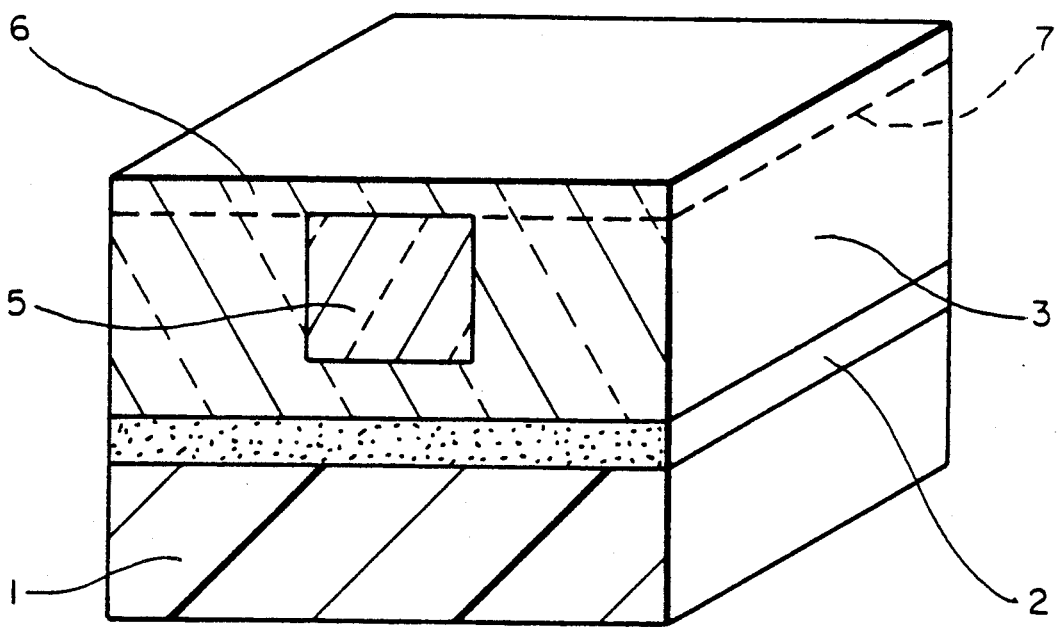
FIG_6

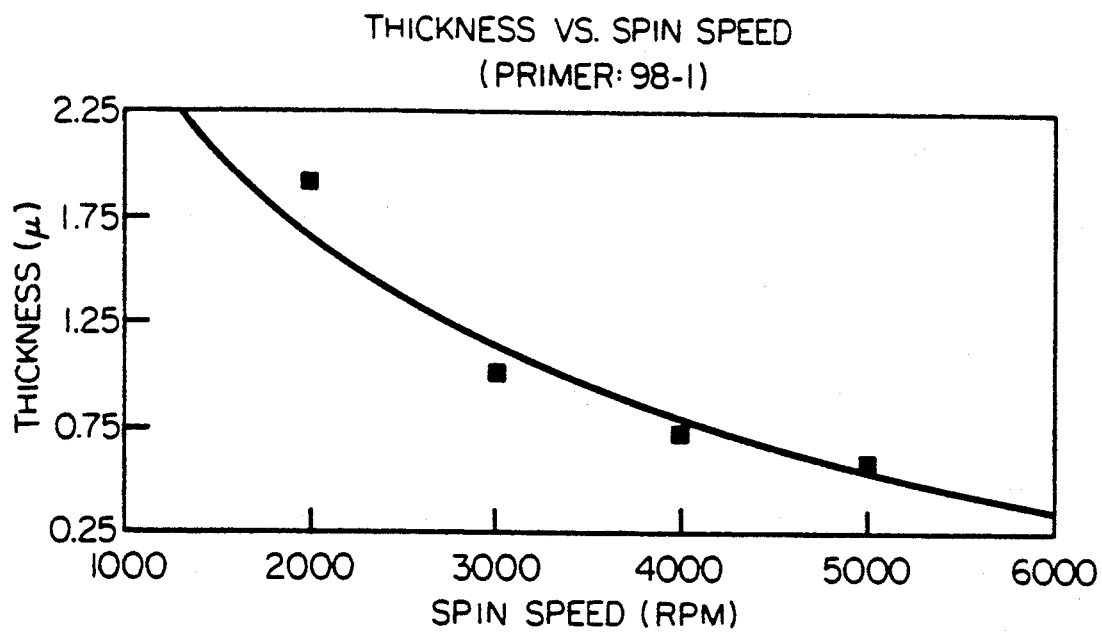
FIG_7
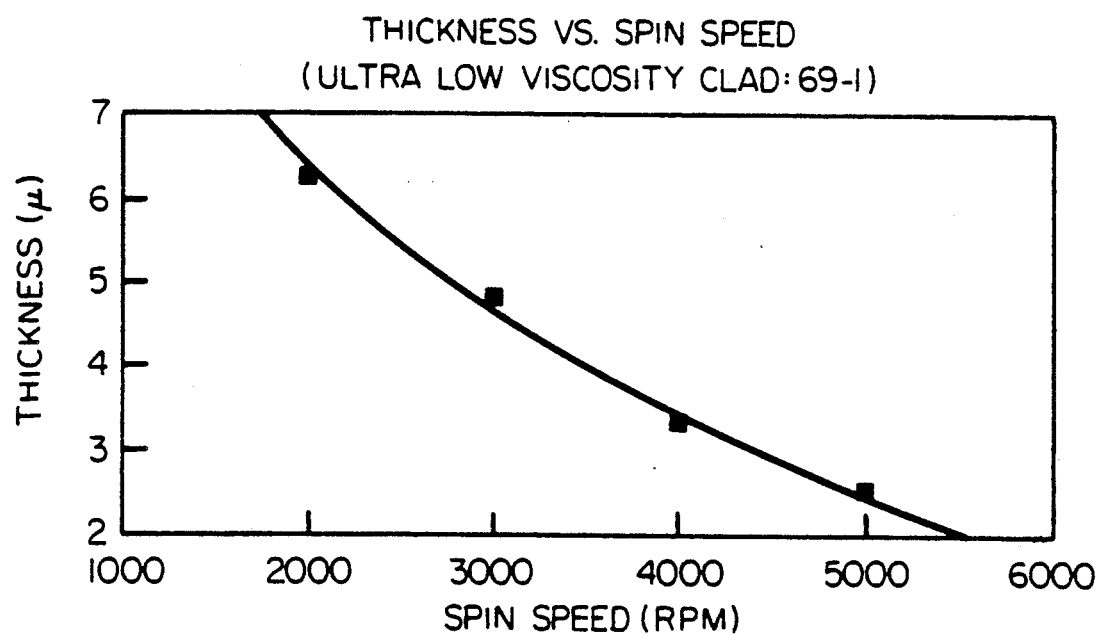
FIG_8

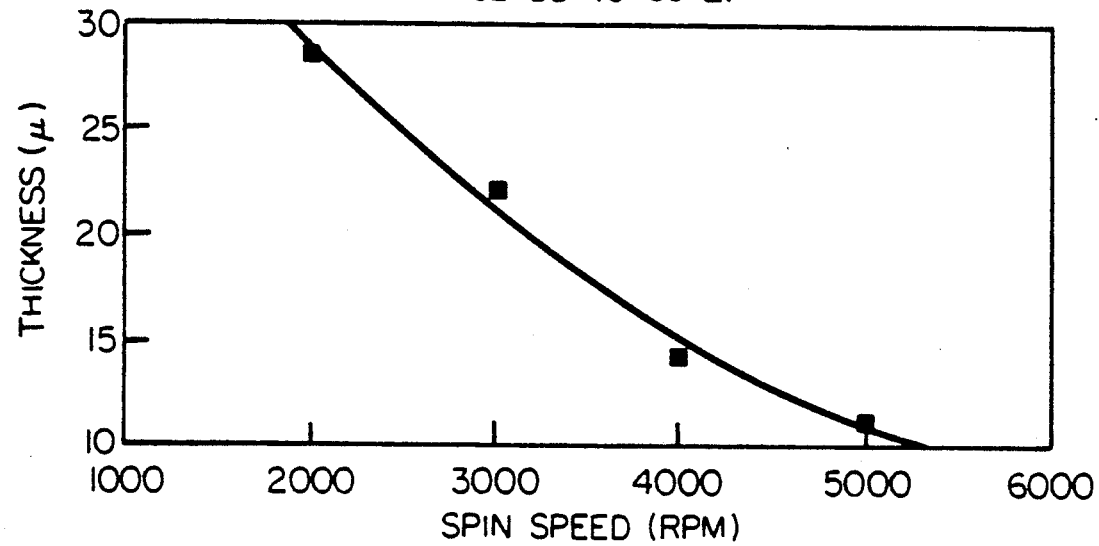
FIG_9
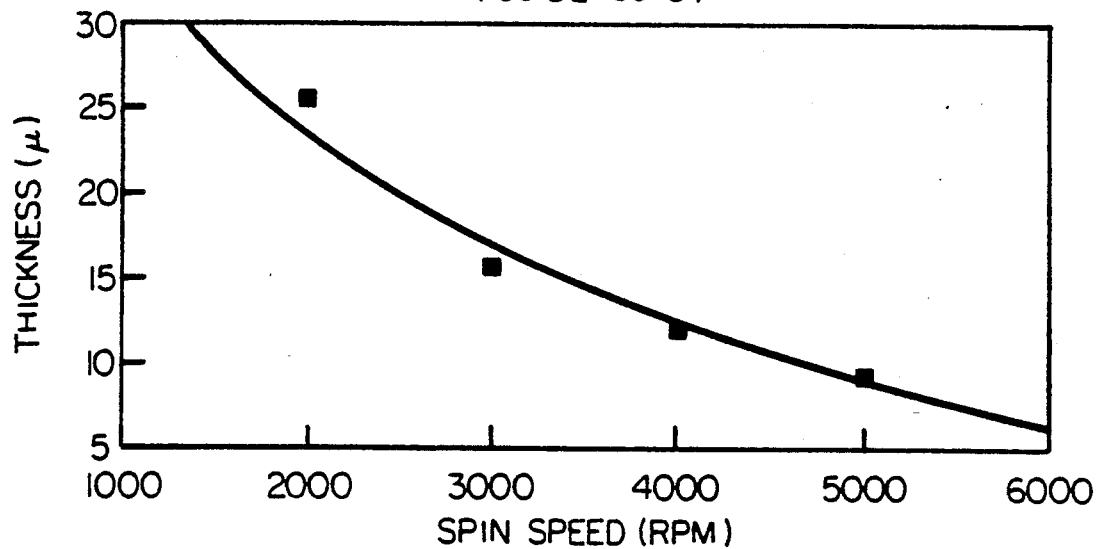
FIG_10

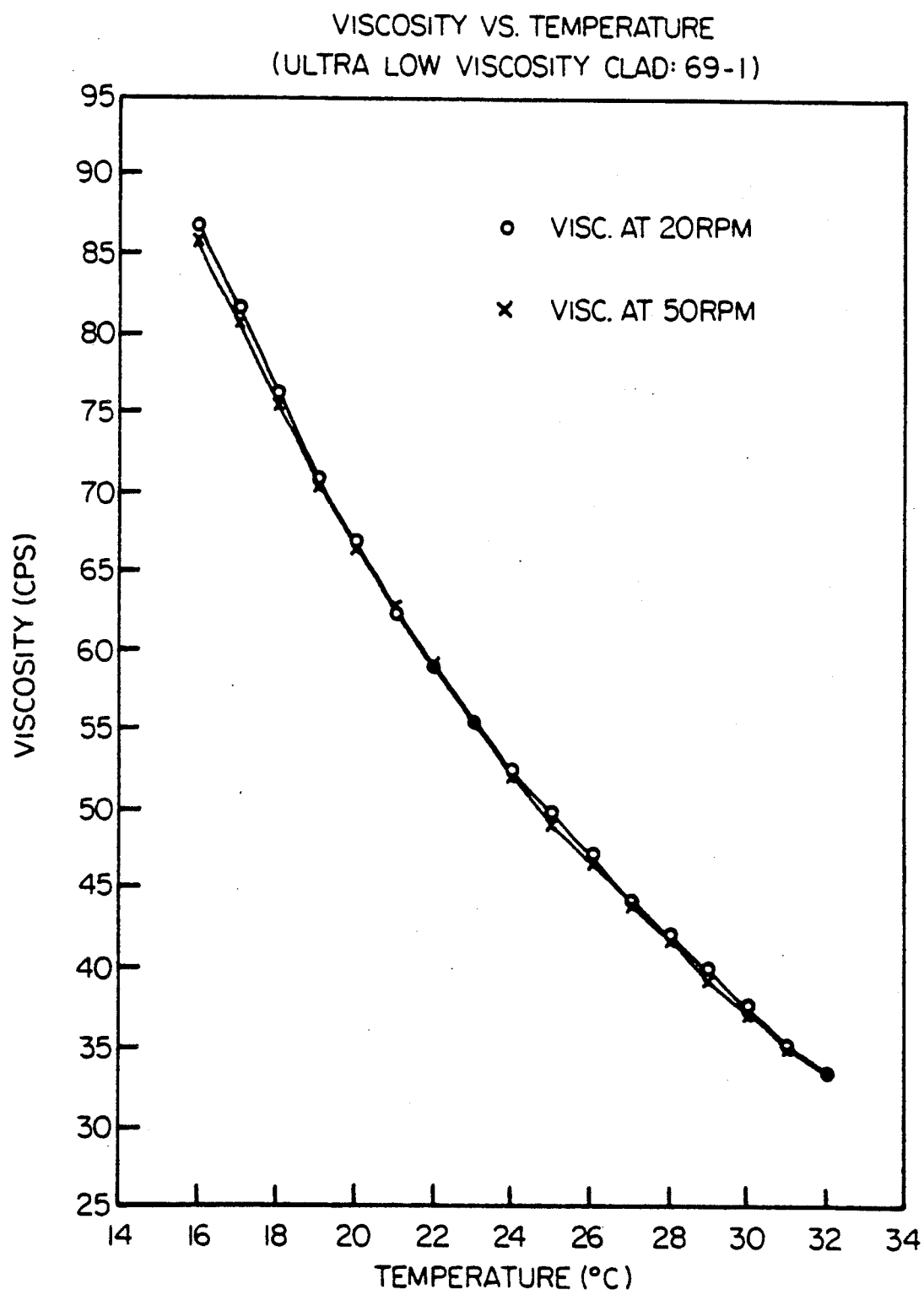
FIG_11

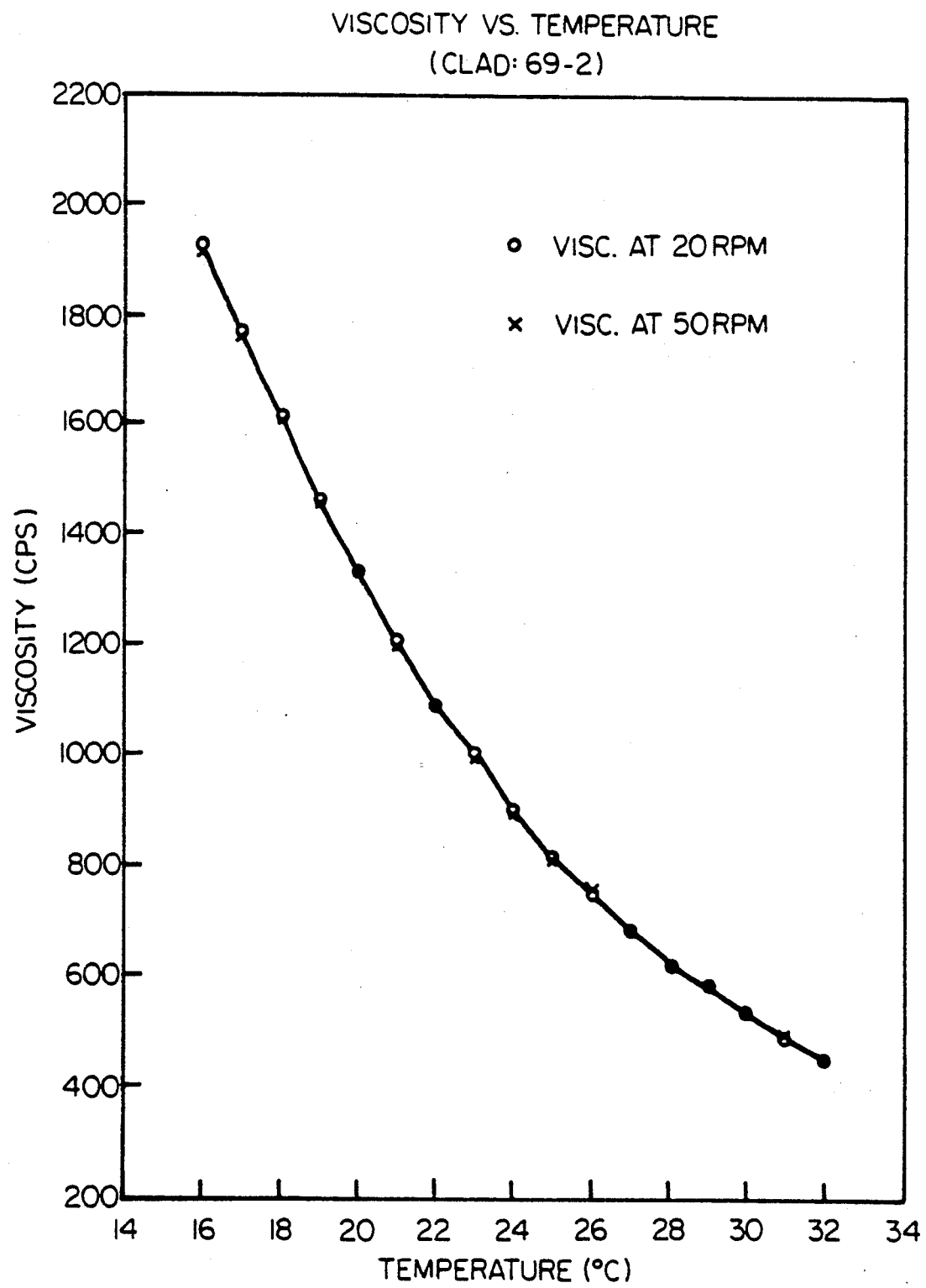
FIG_12

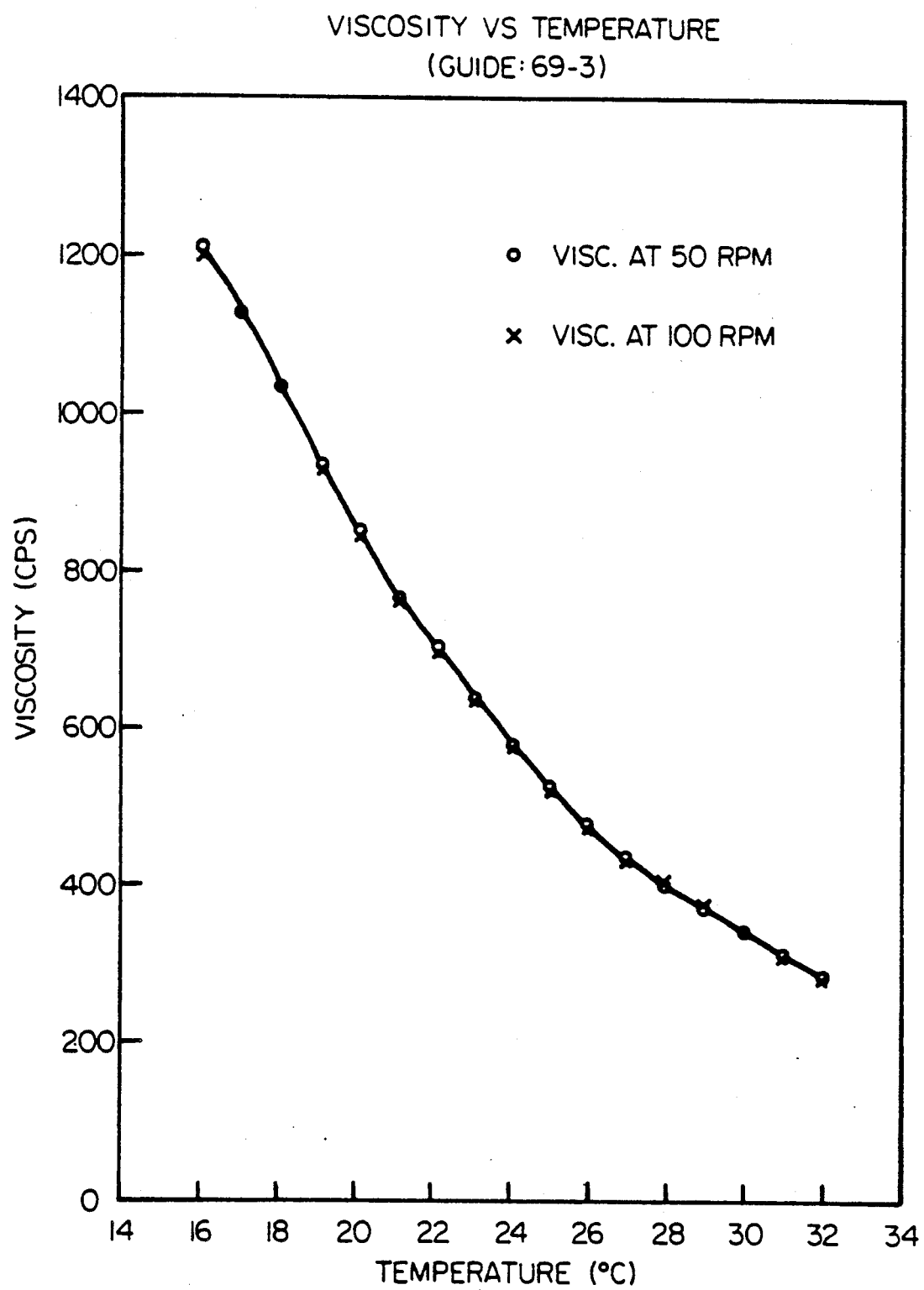
FIG_13

CURABLE COMPOSITIONS AND METHODS FOR USE IN FORMING OPTICAL WAVEGUIDE STRUCTURES

FIELD OF THE INVENTION

This invention relates to polymerizable compositions which can be cured with radiation, for example, ultraviolet (uv) light. The compositions are useful for forming optically clear rib or channel waveguide structures. This invention also relates to materials and articles resulting from the curing of such compositions and to methods of forming layers of such cured materials on substrates which are difficult to adhere to.

BACKGROUND OF THE INVENTION

Optical interconnections offer several significant advantages over their electrical counterparts, such as large signal bandwidths and reduced propagation delay. When circuit arrays are formed at the wafer scale level of integration, the advantages of optical interconnections over their electrical counterparts become even more pronounced.

Low loss multilayer integrated optical waveguides using optically transparent polyimide as an embedding material and as a waveguide dielectric have been proposed in the prior art. Standard lithography processes, together with dry etching, have been used to create experimental integrated optical waveguides.

By way of example, optical waveguiding in poly(-methyl methacrylate), polycarbonate and polyimide has been reported by Franke and Crowe in an article entitled "Optical waveguiding in Polyimide" *SPE Vol. 651 Integrated Optical Circuit Engineering III*, 1986, pp. 102-107. Amongst the polyimides studied was a polyamide-imide. Styrene and benzoin were found to be soluble in solutions of this resin and the carefully dried mixture could be first uv lithographed and then thermally cured to develop and fix a pattern on substrates such as glass or fused silica.

Kokubun, Baba and Iga reported their work relating to a "Silicon Optical Printed Circuit Board for Three-Dimensional Integrated Optics" in *Electronics Letters*, Vol. 21, No. 11, (1985), pp. 508-9. These workers cured a monomer blend (styrene and benzyl methacrylate) in Vee grooves in a silicon substrate.

Sullivan and Husain in a paper entitled "Guided-wave Optical Interconnects for VLSI Systems", *SPIE Vol. 881 Optical Computing and nonlinear Materials*, 1988, pp. 172-176 describe the use of negative-acting photosensitive polyimide to improve the smoothness of the sidewalls in low loss optical interconnects.

Sullivan reports further in an article entitled "Optical Waveguide Circuits for Printed Wire Board Interconnections", *SPIE Vol. 994 Optoelectronic Materials, Devices, Packaging and Interconnects II*, 1988, pp. 92-100. This article describes optical waveguides formed of optical quality polyimide covered with a silicon dioxide cladding.

Christiansen, in an article entitled "Plasma-etched Polymer Waveguides for Intrachip Optical Interconnects", *SPIE Vol. 836 Optoelectronic Materials, Devices, Packaging and Interconnects*, 1987, pp. 359-363, forms waveguide materials, from polyimide and polystyrene on a silicon dioxide substrate, which guide light from gallium arsenide LEDs and to silicon photodetectors.

Hartman, Howse, Krchnavek and Ladany, in an article entitled "Patterned channel waveguides on printed circuit boards for Photonic Interconnection Applications", *Technical Digest, Topical Meeting on Integrated and Guided Wave Optics*, paper no. MC4-1, pp 63-65 (1988), describe the fabrication of waveguides from "commercially available ultraviolet curing adhesives . . . The materials have a glass transition temperature of −10 degrees centigrade, but they maintain their adherence properties to at least 100 degrees centigrade." Later they state "There are a host of radiant curing optically clear adhesives available in the industry. Many have lower glass transition temperatures and higher temperature ranges of operation. We are currently evaluating these materials."

Hartman, Lalk, Howse and Krchnavek, in an article entitled "Radiant Cured Polymer Optical Waveguides on Printed Circuit Boards for Photonic Interconnection Use", *Applied Optics*, Vol. 28, No. 1, January 1989, pp. 40-47, describe the fabrication and evaluation of patterned channel waveguides formed on printed circuit card material by use of ultraviolet light cured adhesive films as channel waveguide material. They state:

"Because the waveguide materials were formulated as adhesives (and often called epoxies, albeit inaccurately), films can be adhered to many types of surface—clearly Teflon composites are one of the most difficult. As long as complete curing of the film is accomplished, through proper intensity-exposure time combinations and avoidance of unreasonably thick films (>250 $\mu$m), adhesion has not been a problem."

Substrates were Teflon ™ composite PC board material, epoxy-fiberglass board, aluminum ceramic, glass and silicon. Commercially available adhesive curable compositions such as Electrolite 4481 and Norland 63 were used to prepare the waveguides.

In the fabrication of acrylic or other polymer based channel waveguide and rib waveguide structures, it is advantageous and often essential to have extremely thin polymer films incorporated into the completed structure. There are various semiconductor type processing methods which can be used for creating thin films which can then be ultraviolet cured to make acrylic based waveguide structures. One important method which can be used is spin coating. Spin coating involves dispensing the material onto a wafer upon which the waveguide structure is being fabricated. The wafer is then rotated at a speed that will yield the desired film thickness and the coating then cured. Another important method of creating thin films is plasma etching. By way of example, an oxygen plasma (for organic materials), run under isotropic conditions, may be used to reduce a thick acrylic film evenly to a desired uniform thickness.

In connection with the formation of optical waveguide structures in polymer substrates, materials forming the channel waveguide media must satisfy a number of materials requirements and manifest certain requisite properties. Among the numerous properties such materials must possess are: high optical transparency at the wavelengths of interest (especially the 550-1550 nanometer spectral region), rapid and complete cure characteristics, workable fluid phase precursor consistencies prior to placement and cure, and selectable/controllable refractive indices. These materials must also be able to adhere securely to various substrates such as polyimide, gallium arsenide, indium phosphide, silicon nitride and crystalline silicon, which, in general, are difficult to adhere to. They must also show good adhesion between layers, i.e., good interlayer adhesion. Optical waveguide structures made from such materials must not show significant signal loss (attenuation) after being subjected to thermal cycling.

Ultraviolet light curable acrylic polymers have been proposed in the prior art, by Hartmann and coworkers, as indicated above, for channel waveguide structures. Thalacker and Boettcher in "Radiation Curing for Thermal Stability", Radiation Curing, November 1985, pp. 2–8 report that the thermal stability of acrylic resins can be improved by using polyfunctional acrylates.

Heretofore, the adhesion issue has been a significant problem. The various substrates noted above are particularly difficult to adhere to. Also, adhesion between layers of ultraviolet light cured resins is generally recognized to be a major problem. Moreover, the use of polyfunctional acrylates to improve the thermal stability of the acrylic resin exacerbates the adhesion problem for one result of crosslinking acrylic polymers is to reduce their ability to adhere and to be adhered to. Thus a hitherto unsolved need exists for fabricating methods and materials which manifest the requisite physical and optical properties while also manifesting greater adhesion to substrates of the above-indicated types.

In certain applications which are described in copending, commonly assigned, concurrently filed U.S. patent application Ser. No. 07/686,230, filed Apr. 15, 1991 and especially when the channel waveguide structures are to be secured to the difficult substrates referred to above, the waveguide materials are required to withstand temperatures of 300° C. or higher for short periods of time. We have found that this requirement precludes the use of most if not all of the abovementioned known polymer candidate optical waveguide materials.

While the foregoing comments establish the existence of a high interest and activity level surrounding optical waveguide technology, the prior approaches have not been completely satisfactory, and the present invention provides significant and unexpected improvements applicable to this technology in order to satisfy the materials and process requirements noted above.

SUMMARY OF THE INVENTION

A general objective of the present invention is to provide materials and processes for use in forming optical waveguide structures such that the limitations and drawbacks of prior materials and processes are overcome.

A more specific objective of the present invention is to provide polymerizable compositions for use in forming polymeric layered optical waveguide structures which will adhere well to semiconductor and other difficult substrates.

A specific objective of the present invention is to provide materials for use in forming polymeric single mode channel optical waveguide structures which will adhere well to semiconductor and other difficult substrates.

Yet another specific objective of the present invention is to provide a method for forming a primer layer on a substrate and materials for use in such methods such that polymeric optical waveguide structures formed thereon will exhibit secure adhesion thereto.

A still further specific objective of the present invention is to provide methods for forming multi-layer polymer structures which exhibit secure interlayer adhesion.

Another specific objective of the present invention is to provide materials, for use in forming polymeric layered optical waveguide structures, which will adhere well to semiconductor and other substrates that are difficult to adhere to, show good interlayer adhesion and be sufficiently thermally stable at temperatures in excess of 280° C., for example, 290° C.; preferably 300° C., especially 310° C., such that soldering and other high temperature operations for the attachment of, for example, electronic components to the substrate bearing these waveguide structures may be readily accomplished.

Yet another specific object of the present invention is to provide polymeric optical waveguide dielectric materials and formulations which manifest suitable optical properties, which are capable of being handled during fabrication of optical waveguide structures, which are curable by exposure to ultraviolet light energy and which manifest improved adhesion to other polymer layers and to difficult substrates, such as ultraviolet light cured polymer substrates, quartz, gallium arsenide, indium phosphide and crystalline silicon and which when used in optical waveguide structures have optical attenuation values less than 3 dB per cm after heating at 300° C. for 3 minutes and preferably have optical attenuation values less than 3 dB per cm after heating at 300° C. for 5 minutes.

Another specific objective of the present invention is to provide methods of quality control of optical waveguide structures whose optical properties are stable at temperatures of at least 300° C.

One more specific objective of the present invention is to provide polymer optical waveguide materials that are specifically fine-tuned for desired optical properties, such as refractive index while providing adequate physical properties, including sufficient adhesion to difficult substrates.

An especial objective of the present invention is to provide materials particularly suited for use in novel methods of forming optical waveguide structures upon substrates as described in copending, commonly assigned, concurrently filed U.S. application Ser. No. 07/686,230, filed Apr. 15, 1991, the entire disclosure of which is incorporated by reference herein for all purposes.

In accordance with the present invention novel methods are provided for forming waveguide structures from compositions that are uv curable. These methods are of particular use in the preparation of waveguides by patterning rib and patterning channel lithographic systems. These polymerizable compositions can be cured using these novel methods to provide novel rib or channel waveguides.

A first aspect of this invention provides a polymerizable composition for the preparation of single and multimode rib or channel optical waveguides, containing at least 0.005 moles per g ethylenic unsaturation, at least 50 equivalent weight percent of which is contained in at least one polyfunctional unsaturated monomer.

A second aspect of this invention provides a polymerized composition, for use in optical waveguides, which has been formed by curing a polymerizable composition, containing at least 0.005 moles per g ethylenic unsaturation, at least 50 equivalent weight percent of which is contained in at least one polyfunctional unsaturated monomer component, by exposure to radiation.

A third aspect of this invention provides a method for forming a layer of optical waveguide material on a substrate which comprises:
  placing on at least part of a surface of the substrate a primer precursor layer
    comprising an acrylic monomer containing at least two unsaturated groups per
    molecule of the monomer; and
  curing the primer precursor layer;
whereby a film is formed of primer less than 5 μm thick securely adhered to the substrate.

A fourth aspect of this invention provides an article comprising a substrate and a primer coat, the substrate comprising at least one of crystalline silicon, silicon nitride, gallium arsenide, indium phosphide and polyimide and the primer coat comprising an addition polymer in a layer less than 5 μm thick securely adhered to at least part of one surface of the substrate.

A fifth aspect of this invention provides an article comprising a substrate and, securely adhered to at least part of a surface of the substrate, a primer comprising an addition polymer in a layer less than 5 μm thick securely adhered thereto and further comprising an optical waveguide cladding layer in contact with at least part of one surface of the primer coat and an optical waveguide matrix material layer, in contact with and surrounded by the first cladding layer on at least two sides thereof; the layers in combination defining an optical waveguide structure.

A sixth aspect of this invention provides a method of forming a multilayer polymer assembly which comprises:
  (a) forming on at least part of a surface of a substrate a first layer comprising at least one ethylenically unsaturated monomer;
  (b) curing the monomer containing layer to form a first polymeric layer having a first $T_g$ (glass transition temperature);
  (c) heating the assembly to a temperature above the $T_g$ of the first layer for a period of at least 15 seconds; and
  (d) further curing the assembly.

Preferably, this method further comprises a step of forming, on the cured first layer, a second layer comprising at least a second ethylenically unsaturated monomer, which may be the same as or different from the first monomer; and then curing the second layer to form a second polymer layer having a second $T_g$. The second polymer layer is formed after step (c) but prior to step (d). Step (d) thus also serves as the step of curing this second layer. The substrate may suitably comprise a layer of a primer material, as contemplated in the fifth aspect of the invention, upon which the first layer is formed. In other embodiments the substrate may comprise one or more superimposed layers of already formed cured polymer over which the first layer is formed.

A seventh aspect of this invention provides an optically clear material comprising an acrylic resin, previously vacuum dried for 4 hours at 150° C., which after being exposed to a temperature of 300° C. in air for 3 (and preferably for 5) minutes, suffers a loss of less than 10% by weight of its dry weight.

In an eighth aspect this invention provides an optically clear organic polymer material, having an attenuation at a selected optical wavelength of less than 3 dB per cm of optical path length, and which, after being predried in vacuum for 4 hours at 150° C., has a refractive index value at the selected wavelength, for example 1.32 μm, which changes by less than 0.02, for example less than 0.01, more preferably by less than 0.005, after the material is exposed to a temperature of 300° C. in air for 3 minutes and preferably, 5 minutes.

In a ninth aspect this invention provides an optically clear material comprising a crosslinked acrylic resin having a $T_g$ of at least 100° C., which $T_g$ is at least 25° C. higher than the $T_g$ of the corresponding uncrosslinked resin.

A tenth aspect of this invention provides a method of quality control of a plurality of optical waveguide devices which comprises:
  (1) carrying out on each or selected ones of the devices a test which consists of:
    (a) heating the device in an oven under vacuum at 150° C. for 4 hours to remove volatile materials;
    (b) determining an initial optical attenuation ($A_1$) of the device at a selected wavelength;
    (c) then placing the device in an oven heated to a temperature of 300°±3° C. for a period of 3 minutes;
    (d) then removing the device and allowing it to cool to room temperature;
  (2) then determining a final optical attenuation ($A_2$) of the device at the selected wavelength:
  (3) then determining whether $A_1$ is greater than 3 dB per cm and whether $A_2-A_1$ is greater than 1.5 dB per cm; and
  (4) rejecting those devices or batches containing those devices that have $A_1$ greater than 3 dB per cm and/or $A_2-A_1$ greater than 1.5 dB per cm.

An eleventh aspect of this invention provides an optical waveguide structure which comprises an organic polymer and which, after having been subjected to a test which comprises:
  (1) heating the waveguide structure in an oven under vacuum at 150° C. for 4 hours to remove volatile materials;
  (2) determining an initial optical attenuation ($A_1$) of the waveguide structure at a selected wavelength;
  (3) then placing the waveguide structure in an oven heated to a temperature of 300°±3° C. for a period of 3 minutes;
  (4) then removing the waveguide structure and allowing it to cool to room temperature;
  (5) then determining a final optical attenuation ($A_2$) of the waveguide structure at the selected wavelength,
has a value of $A_1$ less than 3 dB per cm and a value of $A_2-A_1$ less than 1.5 dB per cm.

BRIEF DESCRIPTION OF THE DRAWINGS

FIG. 1 is a partial view in section of a substrate covered with the primer of the invention.

FIG. 2 is a partial view in section of the FIG. 1 wafer structure covered by a layer of the optical cladding of the invention formed from a layer of the optical cladding precursor material spun-coated on and then cured.

FIG. 3 is a partial view in section of the FIG. 2 wafer structure on which has been laid a patterned plasma etch mask layer and the structure then subjected to a plasma etch to form a trench for receiving the light guide layer.

FIG. 4 is a partial view in section of the FIG. 3 wafer structure after the etch mask has been removed and a layer of the light guide precursor material of the invention spun coated on and then cured, for example, with uv light, to form a layer of light guide material.

FIG. 5 is a partial view in section of the structure of FIG. 4 after the light guide layer of the invention has been etched away such that the top surface of the lightguide layer is substantially coplanar with the top surface of the cladding layer whereby a channel waveguide structure is formed.

FIG. 6 is a partial view in section of the FIG. 5 wafer structure which has been spin coated with a further layer of the optical cladding precursor material which has then been cured, for example, with uv light to form another channel waveguide structure of the invention.

FIG. 7 shows how the thickness of a preferred primer formulation varies with spinning speed in a spin coater.

FIG. 8 shows how the thickness of a preferred thin cladding formulation varies with spinning speed in a spin coater.

FIG. 9 shows how the thickness of a preferred cladding formulation varies with spinning speed in a spin coater.

FIG. 10 shows how the thickness of a preferred guide formulation varies with spinning speed in a spin coater.

FIG. 11 shows how the viscosity of a preferred thin cladding formulation varies with temperature.

FIG. 12 shows how the viscosity of a preferred cladding formulation varies with temperature.

FIG. 13 shows how the viscosity of a preferred guide formulation varies with temperature.

DETAILED DESCRIPTION OF THE INVENTION

Rib and channel optical waveguides are composite or laminar structures, both of which are constructed from at least two optically clear optical waveguide materials. One of the optical waveguide materials is used as a cladding and is a lower refractive index (for example, 0.005 lower) than the other optical waveguide material which is used as the light guide. The guide material is laminated between and surrounded by cladding material such that a means for transmitting light from a first to a second end of the waveguide is formed thereby. An optical waveguide material is an optically clear material suitable for use as a cladding material or for use as the light guide material in an optical waveguide.

As to the first aspect of the invention, preferably at least 67 equivalent weight percent of the unsaturation is contained in the at least one polyfunctional unsaturated monomer component. More preferably, at least 80% of the unsaturation is contained in the at least one polyfunctional unsaturated monomer. In certain embodiments substantially all (that is, at least 90% of) the ethylenic unsaturation is contained in the at least one polyfunctional unsaturated monomer. In other of these embodiments it is preferred that all the ethylenic unsaturation is contained in the at least one polyfunctional unsaturated monomer. Preferably, the polymerizable composition contains at least 0.065 moles per g ethylenic unsaturation. In certain embodiments, more preferably the polymerizable composition contains at least 0.008 moles per g ethylenic unsaturation. In certain embodiments, for example, compositions for use as primer layer formulations, most preferably the polymerizable composition contains at least 0.009 moles per g ethylenic unsaturation.

As to the second aspect of the invention, preferably the composition is in the form of a rib or channel optical waveguide. Preferably the optical waveguide is single mode.

In certain embodiments of the aspects of the invention the polymerizable composition also comprises a polymer or oligomeric component. In some of these embodiments the polymer or oligomeric component comprises ethylenic unsaturation, that is, it is an unsaturated monomer. Preferably it is a polyfunctional unsaturated monomer.

The polymerizable compositions, used to form these novel optical waveguide structures, contain at least a first component. This first component comprises a single monomer or a mixture of monomers and may be used alone or mixed with the second component. It may be used alone to provide, after curing, inter alia, a primer coating over a substrate. At least one of the monomers is ethylenically polyfunctional, that is, it contains at least two carbon-carbon unsaturated groups per molecule. Thus, for example, the first component may comprise one or more compounds each having two or more unsaturated groups per molecule and/or one or more compounds each having one unsaturated group per molecule. The first component is used together with a second component to form, inter alia, the optical waveguide core (or guide) layer and the cladding layers for the core. The second component comprises a monomer, a homopolymer and/or a copolymer or any mixture thereof. The homopolymer or copolymer can be, for example, a polymer formed by the addition or condensation polymerization of one or more compounds. If the second component comprises a polymer, the polymer preferably contains more than one ethylenically unsaturated group.

Suitable polyfunctional unsaturated monomers are acrylic monomers containing at least two ethylenically unsaturated groups including but not limited to 1,3-butylene glycol diacrylate, 1,4-butane diol diacrylate, diethylene glycol diacrylate, 1,6-hexanediol diacrylate (HDDA), triethylene glycol diacrylate, tripropylene glycol diacrylate (TPGDA), tetraethylene glycol diacrylate (TEGDA), trimethylolpropane triacrylate (TMPTA), dipentaerythritol hydroxy pentaacrylate (DPEHEA), pentaerythritol triacrylate, pentaerythritol tetraacrylate, tris(2-hydroxyethyl)isocyanurate triacrylate, ethoxylated Bis-phenol A diacrylate and the like; fluorinated monomers such as 2,2,3,3,4,4-hexafluoropentamethylene glycol diacrylate, perfluorohexylmethyl ethylene glycol diacrylate and the like. Methacrylate monomers may be added to one or more of the above in small amounts (see below).

The monomer or monomer mixture used in either component may comprise at least one compound having one ethylenically unsaturated group per molecule which is selected from one or more of substituted and unsubstituted alkyl, cyclo-alkyl and aryl acrylates, such as isobornyl acrylate, tetrahydrofurfuryl acrylate, $\beta$-naphthyl acrylate, $\beta$-decahydronaphthyl acrylate, styrene, n-vinyl pyrrolidone, vinyl carbazole, n-vinyl caprolactam, styrene-maleic anhydride and vinyl toluene. Each composition, comprising the first component, after curing to form a primer layer, or the first and second components together, after curing to form a cladding layer or a core layer, yields a polymer with a $T_g$ of at least 100° C. Small amounts of methacrylates may also be added to one or more of the above monomers but we have found that inclusion of large amounts (that is, over 10 mol %) of such monomers reduces the cure rate.

The homopolymer or copolymer may be one or more of aliphatic polyesters or oligoesters, such as result from the condensation of diols (together with triols) and diacids, for example, of hexane diol with adipic acid, or butane diol and/or trimethylol propane with succinic acid. Preferably, these polyesters or oligoesters are terminated with groups containing ethylenic unsaturation, for example with acrylic groups. Other suitable materials include epoxidized resins derived, for example, from bis-phenol A, especially ethoxylated epoxy resin acrylates.

We have found that, due to the nature of the film forming processes used in fabricating optical waveguide structures, it is advantageous to provide monomers that are substantially nonvolatile. This is because during spin coating, for example, the polymerizable composition is subjected to conditions of high air velocity which would cause volatile compounds, if present, to evaporate away from the coating. Thus we prefer to use monomers in the present invention that have high boiling temperatures, for example, at least 150° C. at STP (standard temperature and pressure), preferably monomers having boiling temperatures of at least 175° C. at STP, more preferably monomers having boiling temperatures of at least 180° C. at STP, most preferably monomers having boiling temperatures of at least 200° C. at STP.

Following fabrication of, for example, rib or channel optical waveguide structures, we have found it advantageous to secure to such structures electronic components or electrical contacts, for example, formed of solder, to facilitate connection of such structures to an electronic circuit. This is most easily accomplished by solder reflow techniques during which the assembly may be heated to temperatures in the range of about 280° to 310° C. for periods of from 1 to several minutes. Acrylic polymers are quite well suited to this application except that they are thermally unstable in this temperature range. It is well known that acrylic polymers based on monounsaturated acrylates are particularly prone to thermal depolymerization and consequent loss of weight on exposure to temperatures in excess of 250° C. We have found that such exposure can also lead to an increase in optical attenuation and even to mechanical cracking of the acrylic film. We have found further that the introduction of high levels of crosslinking into an acrylic polymer matrix, especially when the crosslinking uses certain preferred types of polyfunctional unsaturated monomers, dramatically reduces the rate at which such loss in weight occurs at 280° to 310° C. to the extent that it can survive the exposures necessary for further fabrication of these waveguide structures without significant loss of material or in the level of the physical and optical properties of the material.

We have also found that the use of crosslinking monomers (that is, monomers that contain at least two unsaturated groups and that are described elsewhere in this Specification as polyfunctional monomers) in the polymerizable compositions greatly reduces the ability of such compositions both to adhere to the difficult substrates referred to above and to be adhered to. Polymerization leads to an increase in the density of polymerizable compositions and the resultant shrinkage induces considerable stress at the interface between the reacting composition and the substrate. This stress exacerbates the difficulties of securing good adhesion to the substrate and frequently causes the cured layer to delaminate therefrom. However, we have unexpectedly found that if a very thin layer comprising certain polyfunctional monomers (that is, monomers containing two or more ethylenically unsaturated groups per molecule and comprising those listed hereinabove) is applied to the substrate and then cured, the resultant "primer" layer shows excellent adhesion both to the substrate and, more remarkably, to any further optical waveguide material, especially those acrylic materials contemplated by the present invention, which may be applied thereto. A very thin (less than 5 μm thick, for example, less than 4 μm thick) primer layer of, for example, acrylic primer material cured onto the substrate acts as a very good bonding layer for any other layer, especially a cured layer, subsequently formed thereon. Thus, as to the third, fourth and fifth aspects of the invention, preferably the primer layer is less than 3.0 μm thick, for example, less than 2.5 μm thick; more preferably, the primer layer is less than 2.0 μm thick, for example, less than 1.5 μm thick; most preferably, the primer layer is less than 1.0 μm thick, for example, less than 0.65 μm thick. Primer layers of the invention may also be used to facilitate adhesion of polymerizable compositions of the invention to an already cured polymerizable composition, for example, one of the invention. This is particularly useful where, for whatever reason, the heating and additional curing method of the sixth aspect of the invention cannot be used. However, if the primer of the invention is used to facilitate adhesion of optical waveguide layers to one another, it is essential to match the optical refractive index of the primer carefully in the range of that of the two optical layers.

Again, as to the third aspect of the invention, it is preferred that at least one layer of optical waveguide material is then applied to the already formed primer layer.

As to the fourth and fifth aspects of the invention, we prefer that the addition polymer used in the primer coat comprises an acrylic polymer. Preferably at least one layer of optical waveguide material is securely adhered to the primer layer. Preferably the primer precursor layer and any layer of optical waveguide precursor material applied thereafter is cured with radiation, more preferably with one of infra-red, ultraviolet or ionizing radiation. If the radiation used is ultraviolet light, the compositions of the invention advantageously also comprise at least one photo-initiator.

As to the fifth aspect of the invention, preferably the structure also has a top layer of optical waveguide cladding material over the optical waveguide structure. Preferably the optical waveguide structure is a single mode rib or channel waveguide structure.

As to the sixth aspect of the invention, we have found that, in general, it is not necessary to heat a primer layer after forming and curing it. Although we do not wish to be limited to any particular explanation, we believe that because the primer layer is very thin and is normally cured in air, it requires longer cure times (for example by exposure to uv light) as a result of which the layer becomes heated by the incident radiation to a sufficient degree during the cure cycle itself to facilitate adhesion of further layers thereunto. However, especially if the cure time for a primer layer can be decreased, for example, by carrying out the cure in an inert atmosphere, this invention also contemplates an optional subsequent heating step for a cured primer layer.

Although we do not wish to be limited to any particular theory of operation of the methods of this aspect of the invention, it is believed that heating a cured polymer layer above its $T_g$ permits movement and realignment of the crosslinked polymer chains with the result that residual unsaturated groups are made accessible, during a subsequent cure step, to further reaction with each other or, if at or near an interface, with unsaturated groups in an adjacent layer comprising monomer and/or polymer. It follows that, once a layer has been heated once to a temperature above its $T_g$, it is not necessary to heat it again above its $T_g$ and we believe that no further significant benefit accrues therefrom.

The step of heating and then further curing already formed and cured layers of the polymer assembly improves the adhesion therebetween and the ability of any further layer to adhere to the topmost layer thereof. Because the final layer of an assembly would not normally have any further layers laid upon it, that final layer does not itself require heating and curing steps. However, this invention contemplates carrying out heating and curing steps, to enhance adhesion between all the layers, at least after formation and curing of one of (a) the penultimate layer or
(b) the final layer of the assembly (option (a) being preferred). It is essential, of course, that in the case, for example, of uv or ionizing radiation curing, the radiant energy can penetrate all the cured layers of the assembly to be treated to effect a further cure thereof. If desired the heating and curing step may be carried out between each or any step of forming successive polymer layers. By way of example, we shall consider the formation of a four layer structure, the first layer being a primer layer, which, as noted above, normally does not need to be heated before being coated with other layers. The heating and curing steps of the invention may be carried out advantageously:

(a) after formation and curing of the second layer and/or
(b) after formation and curing of the third layer; or
(c) it may be carried out after formation of the third (or penultimate) layer to enhance adhesion between the second and third layer and to prepare the third layer for application of the fourth and final layer; or
(d) it may be carried out as a final sequence of steps in the formation of the structure that is, after all four layers have already been formed and cured.

However, as heretofore indicated, alternative (d) is a preferred alternative only if, for whatever reason, the assembly can be heated and then further cured as the last steps in the formation of the assembly.

Thus a step of forming, on the cured second layer, the third layer comprising a third ethylenically unsaturated monomer, which independently may be the same as or different from the first and/or the second monomer, may occur immediately after a step of heating the first and second layers of the assembly, but prior to the cure step, which thus also serves to cure the third layer to form a polymer layer having a third $T_g$. Whether or not the multilayer assembly has been heated, to a temperature above the $T_g$ of all the layers then formed, for a period of at least 15 seconds, between the steps of forming successive layers of polymer, it is highly desirable, once all but the final layer has been formed and cured, to carry out a step of heating the complete assembly to a temperature above the $T_g$ of all the layers then formed, but not already heated to above their $T_g$, for a period of at least 15 seconds followed by a step of forming a final layer, independently comprising at least one ethylenically unsaturated monomer, and a step of curing the entire assembly.

Thus this method also comprises:
(a) forming on at least part of a surface of a substrate a first layer comprising at least one ethylenically unsaturated monomer;
(b) curing the first layer to form a first polymer layer having a first $T_g$ (glass transition temperature);
(c) heating the assembly to a temperature above the $T_g$ of the polymer layer thus formed for a period of at least 15 seconds; and
(d) forming, on the cured first polymer layer, a second layer comprising at least one second ethylenically unsaturated monomer, which may be the same as or different from the first monomer; and
(e) curing the second layer on the assembly and further curing the first layer to form a second polymer layer having a second $T_g$ securely adhered to the first polymer layer.

As we have already indicated, when further layers of material, curable to form a polymer layer, for example, waveguide material, are applied over an already formed cured polymer layer and all the cured layers are been highly crosslinked (for good thermal stability), we have found that heating the already formed layer or layers at least once to a temperature higher than the $T_g$ of the layer with the highest $T_g$ for a period of at least 15 seconds between any or each step of forming a layer results in vastly improved interlayer adhesion properties. Thus, one embodiment of this method comprises:

(a) providing a substrate having a surface coated with a cured primer layer;
(b) forming on at least part of the surface of the primer layer a first layer comprising at least one ethylenically unsaturated monomer;
(c) curing the first layer to form a first polymer layer having a first $T_g$;
(d) heating the assembly to a temperature above the $T_g$ of the first layer for a period of at least 15 seconds; and
(e) forming, on at least part of the surface of the first polymer layer, a second layer comprising at least one second ethylenically unsaturated monomer, which second monomer may be the same as or different from the first monomer; and
(f) curing the second monomer containing layer on the assembly and further curing the first polymer layer to form a second polymer layer securely adhered to the first polymer layer.

Another embodiment of this method comprises:
(a) providing a substrate having a surface coated with a cured primer layer;
(b) forming on at least part of the surface of the primer layer a first layer comprising at least one ethylenically unsaturated monomer;
(c) curing the first layer to form a first polymer layer having a first $T_g$;
(d) forming, on at least part of the surface of the first polymer layer, a second layer comprising at least one second ethylenically unsaturated monomer, which second monomer may be the same as or different from the first monomer; and
(e) curing the second monomer containing layer to form a second polymer layer having a second $T_g$;
(f) heating the assembly to a temperature above the highest $T_g$ of the layers already formed, but not previously heated to above their $T_g$, for a period of at least 15 seconds;

(g) forming, on at least part of the surface of the second polymer layer, a third layer comprising at least one third ethylenically unsaturated monomer, which may be the same as or different from the first and/or the second monomer; and (h) curing the third monomer containing layer and further curing the first and second polymer layers, thereby forming a third polymer layer securely adhered to the second polymer layer and a second polymer layer securely adhered to the first polymer layer.

Normally the cure of the third monomer layer to form the third (or final) polymer layer and the further cure of the first (or prepenultimate) and second (or penultimate) polymer layers are carried out simultaneously, for example, by exposing all the layers of the assembly to UV or to ionizing radiation. It is believed that the beneficial effects of the heating and further curing steps on the adhesion between not just the second and third polymer layers but also between the first and second polymer layers occur because the heating step is to a temperature above the $T_g$'s of all three polymer layers, allowing movement and realignment of the chains such that chemical bonding between all three layers can occur when they are subjected to the further cure step. Although this particular discussion contemplates the formation of three polymer layers it is to be understood that this is only by way of example and that the method of the invention is not limited to any particular number of successive layers provided that the total number of polymer layers is at least two.

Yet another embodiment of this method comprises:

(a) providing a substrate having a primed surface coated with a cured primer layer covered by at least one layer of cured polymer;

(b) forming, on at least part of the outermost surface of the cured polymer layer or layers, a first layer comprising at least one ethylenically unsaturated monomer;

(c) curing the first layer to form a first polymer layer having a first $T_g$;

(d) heating the assembly to a temperature above the $T_g$ of the first layer for a period of at least 15 seconds; and (e) forming, on at least part of the surface of the first polymer layer, a second layer comprising at least one second ethylenically unsaturated monomer, which may be the same as or different from the first monomer; and (f) curing the second layer on the assembly to form a second polymer layer securely adhered to the first polymer layer.

Another embodiment of this method comprises:

(a) providing a substrate having a primed surface coated with a cured primer layer covered by at least one layer of cured polymer;

(b) forming on at least part of the surface of the primer layer a first layer comprising at least one ethylenically unsaturated monomer;

(c) curing the first layer to form a first polymer layer having a first $T_g$;

(d) forming, on at least part of the surface of the first polymer layer, a second layer comprising at least one second ethylenically unsaturated monomer, which may be the same as or different from the first monomer; and (e) curing the second layer on the assembly to form a second polymer layer having a second $T_g$;

(f) heating the assembly to a temperature above the highest $T_g$ of the layers then formed, but not previously heated to above their $T_g$, for a period of at least 15 seconds;

(g) forming, on at least part of the surface of the second polymer layer, a third layer comprising at least one third ethylenically unsaturated monomer, which may be the same as or different from the first and/or the second monomer; and (h) curing the third layer on the assembly and further curing the first and second layers of the assembly to form a third polymer layer securely adhered to the second polymer layer and a second polymer layer securely adhered to the first polymer layer.

Optionally, the heating step may be delayed until after all layers have been formed, in which case the polymer assembly is then subjected to an extra curing step. This embodiment, in which the heating step is delayed until all layers are formed, is not preferred for the reasons that:

(i) it introduces an extra and final curing step not otherwise needed, (ii) if radiant methods of cure are used, the radiation has to be able to penetrate and cure all the layers of cured polymer then formed, and (iii) the final layer of cured polymer does not need to be heated to above its $T_g$ because no further layer will be formed thereon.

Preferably the time period for the heating step in all the embodiments of this aspect of the invention, is at least 30 seconds, for example, 1 minute; more preferably at least 1.5 minutes. If desired and as noted above, in some embodiments the cured polymer layers are formed on a substrate comprising at least one already formed polymer layer. Preferably the curing step or steps are carried out with radiation, more preferably with one of infra-red, ultraviolet or ionizing radiation. Again, as noted above, the first polymer layer of this sixth aspect of the invention may be a primer layer especially as described in the third, fourth and fifth aspects of the invention hereinabove.

As to the seventh aspect of the invention, acrylic wave guide materials of the invention, previously dried in vacuum for 4 hours at 150° C., when heated at a temperature of 300°±3° C. for a period of 3 minutes in a current of air preferably suffer a loss in weight of less than 10% by weight, for example less than 7.5% by weight, of their initial weight; more preferably they suffer a loss of less than 5% by weight, for example less than 4% by weight, of their initial weight; most preferably they suffer a loss of less than 3.5% by weight, for example less than 3% by weight, of their intial weight.

As to the ninth aspect of the invention, preferably the density of crosslinking in the waveguide material resulting from the use of polyfunctional monomer is sufficiently high to raise the $T_g$ of the material significantly above that which would be manifested if (i) the polyfunctional monomer is omitted from the polymerization mixture used to form the material or (ii) all but one of the unsaturated groups in any polyfuntional monomer(s) used to form the waveguide material are replaced by the corresponding saturated group. Preferably the increase in $T_g$ resulting from the use of polyfunctional monomers is at least 25°, for example at least 35°, more preferably at least 45°, for example 50°, most preferably at least 60°, for example 75° C. above that of the corresponding uncrosslinked waveguide material which would be obtained by substitution of saturated groups for all but one of the unsaturated groups as noted above. Preferably the crosslinked waveguide materials used in this invention exhibit $T_g$ values of at least 120° C., more preferably at least 150° C.

The phrase optically clear means that the uncured composition and/or the cured material is substantially transparent to light of a selected wavelength, for example, 1.32 μm; that is, optical waveguide structures formed from these materials exhibit an optical attenuation of less than 3 dB per cm to light of this wavelength. Preferably, the compositions useful in the invention exhibit an optical attenuation of less than 2 dB per cm at 1.32 μm, more preferably less than 1 dB per cm at 1.32 μm. Preferably, optical waveguide structures comprising the cured compositions of the invention, after heating at 300° C. for 3 (and preferably after heating for 5) minutes, increase in optical attenuation at a selected wavelength, for example, 1.32 μm, by less than 1.5 dB per cm, more preferably by less than 1 dB per cm.

As to the eleventh aspect of the invention, preferably the waveguide structure is a rib or channel optical waveguide structure. More preferably the waveguide structure is a single mode rib or channel optical waveguide structure.

Turning to the Figures, FIG. 1 shows a partial view in section of a substrate 1 which has been covered, preferably by spin coating, with a primer material of the invention and then cured to form primer 2 of the invention. The primed substrate is then covered with an optical cladding precursor material which is then cured to form a first optical cladding layer 3 of the invention as shown in FIG. 2. A guide trench etch mask is then deposited over the cladding layer and the structure etched, for example by ion etching, to produce the structure of FIG. 3 in which layer 4 is the etch mask. A layer of light guide precursor material is then laid into the trench and over the top surface of the cladding layer by spin coating and cured to form the layer 5 of light guide material depicted in FIG. 4. The structure is then etched, preferably by plasma etching, to produce a trench waveguide structure as shown in FIG. 5. Preferably another layer of optical cladding precursor material is then laid down preferably by spin coating over the topmost surface of the structure of FIG. 5 and then cured to form a top optical cladding layer 6 of the waveguide structure as depicted in FIG. 6 where the interface between the two cladding layers is indicated by the dotted line 7.

Preferred methods used to form layers of optical waveguide material on a semiconductor substrate thereby fabricating optical waveguide structures including, inter alia, the types shown in these drawings, are described in copending commonly assigned U.S. patent application Ser. No. 07/686,230, filed Apr. 15, 1991.

The term 'securely adhered' as used in this specification means that an assembly having only the primer of the invention applied thereto or a resin layer or layers applied over a primer layer, when subjected to the adhesion test described in ASTM D3359-87 exhibits a performance rating of 4B or higher.

The present invention will be further described in the following specific examples. Unless otherwise indicated, all curing operations in the following examples were carried out using a "Portacure 1500" UV lamp and/or F450 Ultraviolet Lamp System (both supplied by the American Ultraviolet Co.). All percentage values for amounts of ingredients used are by weight.

EXAMPLE 1

Various mixtures of two acrylic oligomers (Ebecryl 1830, an acrylated aliphatic polyester having an average of about 6 unsaturated groups per molecule, and Novacure 3700, an acrylated Bisphenol A diepoxide, both supplied by Radcure Specialties) with polyfunctional acrylates together with a photoinitiator Darocur 1173 (2-hydroxy-2-methyl-1-phenyl-propan-1-one obtained from EM Chemicals), were prepared, cured under a "Portacure" UV lamp and/or a F450 Ultraviolet Lamp System (both obtained from Fusion Systems Corporation, Rockville, Md.) and evaluated by thermal differential gravimetric analysis (TGA 5° C. per min) to assess their stability at 250° and 320° C. The results in Table 1 show that the first four formulations yield resins with the desired degree of temperature stability.

EXAMPLE 2

Layers of monomers, containing 2% by weight Darocur 1173, of varying thickness were spincoated onto a silicon or resin substrate by varying the spinning speed.

TABLE 1

| Stability of acrylic resins Formulation | | | | Weight loss (%) by: | |
|---|---|---|---|---|---|
| Oligomer | weight % | Monomer | weight % | 250° C. | 320° C. |
| Ebecryl 1830 | 50 | TMPTA | 50 | 2.4 | 3.0 |
| Ebecryl 1830 | 50 | HDDA | 50 | 3.6 | 4.1 |
| Novacure 3700 | 50 | TMPTA | 50 | 2.0 | 2.4 |
| Novacure 3700 | 50 | HDDA | 50 | 3.1 | 3.5 |
| Ebecryl 1830 | 50 | TPGDA | 50 | 28.5 | — |
| Ebecryl 1830 | 50 | TEGDA | 50 | 33.1 | — |
| Ebecryl 1830 | 50 | LCDDA* | 50 | 27.5 | — |
| Ebecryl 1830 | 50 | DPEHPA | 50 | 7.2 | — |
| Ebecryl 745 | 65 | IBOA** | 35 | 30.2 | 32.1 |

*A Long chain diol diacrylate (mainly a C14 diacrylate from Sartomer Chemicals).
**Isobornyl acrylate.

The coatings were cured using a 1500 watt "Portacure 1500" UV lamp. The adhesion test was carried out according to ASTM D3359-87 (Standard Test Methods for measuring Adhesion by Tape Test) using Test Method B-Cross-cut Tape Test. In applying this test to the coatings of the invention, unless otherwise noted, a series of eleven cuts about 20 mm long was made 1 mm apart. Eleven crosscuts of the same length and spacing were then made at an angle of 90° to the first series, unless otherwise noted. Adhesive tape (1 in wide semitransparent pressure sensitive tape with an adhesion strength of 43±5.6 g/mm) was then applied and the peel test performed in accordance with the above ASTM. The results are reported in accordance with the following scale (taken from ASTM D3359-87):

5B—The edges of the cuts are completely smooth; none of the squares of the lattice is detached.

4B—Small flakes of the coating are detached at intersections; less than 5% of the area is affected.

3B—Small flakes of the coating are detached along edges and at intersections of cuts. The area affected is 5 to 15% of the lattice.

2B—The coating has flaked along the edges and on parts of the squares. The area affected is 15 to 35% of the lattice.

1B—The coating has flaked along the edges of cuts in large ribbons and whole squares have detached. The area affected is 35 to 65% of the lattice.

0B—Flaking and detachment greater than in grade 1B.

These tests were performed three times in all on each sample. An additional layer of waveguide cladding material was applied to certain of the primer coatings that exhibited good adhesion to silicon. The formulation of this waveguide material was 30 parts by weight Novacure 3700, 20 parts by weight Ebecryl 1830, 45 parts by weight TMPTA, 5 parts by weight HDDA and 2 parts by weight Darocur 1173. Table 2 shows details of the cure and the adhesion results obtained. In the adhesion tests of Table 2 fewer than eleven cuts and crosscuts were made. The results shown on Table 2 demonstrate the dramatic increase in adhesion to both the substrate and, even more unexpectedly, to a subsequent resin layer resulting from decreasing the thickness of the primer layer.

TABLE 2

Dependence of adhesion on layer thickness

| Monomer Used as Primer | Cure Time (Sec.) | Thickness of Monomer layer Microns | Adhesion to silicon | Adhesion to resin layer |
|---|---|---|---|---|
| TPGDA | 180 | 1.10 | 5B | 3B |
| TMPTA | 60 | 3.65 | 0B | — |
| TMPTA | 60 | 1.61 | 0B | — |
| TMPTA | 60 | 1.26 | 0B | — |
| HDDA | 120 | 0.28 | 5B | 5B |
| HDDA | 120 | 0.31 | 5B | 5B |
| HDDA | 120 | 1.61 | 5B | 0B |
| HDDA | 120 | 2.92 | 1B | 0B |
| HDDA | 120 | 3.65 | 0B | 0B |

Table 3 shows the maximum thickness of each of a number of primer precursor materials (monomers) that would exhibit good adhesion (5B) to a silicon substrate. Also shown is the equivalent weight of each monomer and the change in refractive index which occurs on curing each monomer (together with 2% Darocur 1173) with uv light. The refractive index is affected by the change in density on curing so that the relative change in refractive index is an approximate indication of the shrinkage on curing. In Table 3, BDDA is butanediol diacrylate; TEGDA is tetraethylene diacrylate; 1,3-BGDA is butylene glycol diacrylate; TPGDA is tripropylene glycol diacrylate; PETA is pentaerythritol triacrylate; TMPTA is trimethylol propane triacrylate; TMPTMA is trimethylol propane trimethacrylate; DPEHPA is dipentaerythritol monohydroxy pentaacrylate and EGDMA is ethylene glycol dimethacrylate.

TABLE 3

Approximate maximum thickness giving good adhesion to Silicon and Resin

| Monomer Used as Primer | Maximum thickness giving 5B adhesion to Silicon (Microns) | Adhesion to resin layer (Cladding) | Equivalent Weight per Mole C=C | Change in Refractive Index |
|---|---|---|---|---|
| 1,4-BDDA | 1.9 | 5B | 99 | 0.0521 |
| HDDA | 2.8 | 5B | 113 | 0.0472 |
| TEGDA | 2.9 | 5B | 151 | 0.040 |
| 1,3-BGDA | 3.4 | 5B | 99 | 0.0464 |
| TPBDA | 3.9 | 5B | 150 | 0.0362 |
| PETA | >0.44 | 4B at 0.08 μm | | |
| TMPTA | >0.52 | | 99 | 0.0373 |
| DPEHPA | >0.23 | 3B | | |
| BGDMA | >0.32 | | | |
| EGDMA | >1.16 | | | 0.0544 |
| TMPTMA | >1.14 | 5B | | |
| 1,3-BGDMA | >1.05 | | | 0.0483 |

EXAMPLE 3

After spin coating and curing a primer layer (HDDA together with 2% Darocur 1173, 120 sec. cure, 0.28 μm thick) on a silicon substrate, a layer of optical cladding precursor material (35 g Ebecryl 3700, 15 g Ebecryl 1830, 35 g TMPTA, 15 g HDDA and 2 g Darocur 1173) comprising polyfunctional acrylates was laid down over the primer and also cured. The assembly was then heated, recoated with optical waveguide precursor material (50 g Ebecryl 3700, 30 g TMPTA, 20 g HDDA and 2 g Daraocur 1173) and exposed to UV light a second time. Table 4 shows the results of adhesion tests before and after the heating and "re-curing" steps.

TABLE 4

Effect of Heat treatment on Interlayer Adhesion

| Formulation (by weight) Ebecryl 1830 % | Monomer(s) | % | Initial Layer Adhesion | Heat Treatment (°C./secs) | UV Exposure (secs) | Adhesion After Treatment |
|---|---|---|---|---|---|---|
| 50 | TMPTA | 50 | 0B | 100/90 | 40 | 3B |
| 50 | TMPTA + HDDA | 25 25 | 0B | 140/90 | 40 | 5B |

EXAMPLE 4

In this series of tests two successive layers of optical waveguide material were laid down over a primer layer and cured as in the previous examples. The primer layer was HDDA and had a thickness of 0.28 μm. The first layer of optical waveguide material had the formulation 50 g Ebecryl 1830, 25 g TMPTA, 25 g HDDA, 1.8 g Darocur 1173 and 0.2 g. Benzophenone. The layer was UV cured for 40 seconds. The second layer had the formulation 50 g Novacure 3700 with 50 g HDDA, 1.8 g Darocur 1173 and 0.2 g. benzophenone and was also cured for 40 seconds. These assemblies were then tested for interlayer adhesion, by the ASTM standard test outlined above, before and after heat treatment at various temperatures for 90 seconds and with no heat treatment. The results obtained are shown in Table 5, which shows the dramatic increases in adhesion resulting from interposing a heating step for an already cured layer between two curing steps.

TABLE 5

Increasing multilayer adhesion by heat treatment

| Interlayer Adhesion before Treatment | Heat Treatment (°C./secs) | Exposure to UV (secs) | Adhesion between Layers after Treatment (%) |
|---|---|---|---|
| 1B | none | 40 | 0B* |
| 1B | 140/90 | 40 | 2B |
| 1B | 165/90 | 40 | 5B |
| 1B | 175/90 | 40 | 5B |
| 1B | 180/90 | 40 | 5B |

*This is a comparative example.

EXAMPLE 5

The material Ebecryl 3700 is identical to the material Novacure 3700 used in the previous examples. Two silicon substrates were spincoated with a 0.28 micron thick HDDA primer coat which was cured by exposure to a UV lamp for a total of 120 secs. Then a 17 micron layer of cladding (formulation 30 g Ebecryl 3700, 20 g Ebecryl 1830, 45 g TMPTA, 5 g HDDA and 2 g Darocur 1173; viscosity 1080 cps) was spincoated on and cured for 40 secs; followed by a 13 micron layer of guide material (formulation 50 g Ebecryl 3700, 30 g TMPTA 20 g HDDA and 2 g Darocur 1173; viscosity 655 cps) spincoated on and cured for 40 secs. Finally, a 10 micron layer of the above cladding was spincoated on and cured for 40 secs. The two wafer assemblies were placed in a forced air convection oven initially at 210° and the temperature increased to 290° C. over a period of ten minutes. The assemblies were then removed and the loss in weight determined. This procedure was repeated twice more and the loss in weight again determined. The loss in weight for the assemblies on the first cycle was 3.10 and 3.33%, on the second cycle 2.46 and 2.47% and after the third cycle 0.02 and 0.02% respectively. The absence of any significant weight loss during the third cycle shows that the optical waveguide polymers of the invention are quite stable under the conditions of this test (which simulates the temperature profile of a soldering operation) and indicates that almost all of the weight loss in the first two heating cycles was of volatile components.

EXAMPLE 6

The procedure of Example 2 was repeated using an number of acrylic monomers UV cured onto a silicon substrate. On certain of these primer coatings showing good adhesion to the Silicon, a layer of optical waveguide cladding material as in example 2 was placed on the primer layer and the interlayer adhesion tested. The materials used and the results of adhesion tests are shown in Table 6. Table 6 shows the superior adhesion of thinner layers of acrylic resins to both silicon and, even more unexpectedly, to further layers of optical waveguide material laid down on the cured primer layer.

EXAMPLE 7

Using the procedure of Example 6 hexane diol diacrylate (HDDA, 100 parts by weight) Darocur 1173 (1.8 parts) and benzophenone (0.2 parts) was placed as a 0.7 μm layer onto a silicon substrate and UV cured to provide a primed substrate. FIG. 7 shows how the thickness of this primer formulation varies with spinning speed in a spin coater after 10 seconds spinning at 500 rpm and 20 seconds spinning at the indicated speed. Channel and rib waveguide structures were formed on this primed substrate using the procedures disclosed in copending commonly assigned U.S. patent application Ser. No. 07/686,230, filed Apr. 15, 1991. The formulation used for the preparation of the first and second (final) cladding layers is Novacur 3700 (30 g), Ebecryl 1830 (20 g), TMPTA (45 g), HDDA (5 g), Darocur 1173 (1.8 g) and benzophenone (0.2 g). The formulation used for the preparation of the guide layer is Novacur 3700 (45 g), TMPTA (35 g), HDDA (20 g), Darocur 1173 (1.8 g) and benzophenone (0.2 g). The assemblies were heated to a temperature of 180° C. for 1 minute between the steps of curing each separate layer and depositing a further layer for cure. The waveguide structure was further exposed to uv light for 1 minute after the final heating of the complete assembly.

TABLE 6

| Monomer used | Film Thickness | Adhesion of Primer to Si | Adhesion of Cladding to Primer |
|---|---|---|---|
| Dicyclopentenyl-oxyethyl acrylate | 2.18 μm | 4B | 0B |
|  | 1.32 μm | 5B | 0B |
| Phenoxyethyl acrylate | 1.34 μm | 5B | 2B |
|  | 7,190 Å | 5B | 2B |
| Tripropylene glycol diacrylate | 1.31 μm | 5B | 3B |
| Triethylene glycol diacrylate | 1.5 μm | 1B | — |
|  | 1.2 μm | 5B | 5B |
| Hexane diol diacrylate | 2.2 μm | 2B | — |
|  | 1.4 μm | 3B | — |
|  | 9,260 Å | 4B | — |
|  | 6,450 Å | 5B | 5B |
|  | 5,320 Å | 5B | 5B |
|  | 4,280 Å | 5B | 5B |

The waveguide structures formed in this example have optical attenuations of less than 1 dB per cm which changed by less than 5% when the previously vacuum dried structures were heated at 300° C. for 3 minutes.

EXAMPLE 8

Example 7 was repeated using the same primer, guide and cladding materials for the primer, first cladding and guide layers. The final cladding layer was formed from a very thin layer of a formulation having the composition 36 parts by weight Ebecryl 3700, 64 parts HDDA, 1.8% Darocur 1173 and 0.2 parts benzophenone. FIG. 8 shows how the thickness of the final cladding layer formulation of this example varies with spinning speed in a spin coater after 10 seconds spinning at 500 rpm and 20 seconds spinning at the indicated speed. After heating the previously vacuum dried waveguide structure at 300° C. for 2 minutes, the difference in refractive index of cladding and guide layers was found to have changed by less than 1%.

EXAMPLE 9

Example 7 was repeated using the primer formulation described in that example. The formulation used for the first cladding layer was 36 parts by weight Ebecryl 1830, 18 parts Ebecryl 3700, 40 parts TMPTA, 10 parts HDDA 1.8 parts Darocur 1173 and 0.2 parts benzophenone. The formulation used for the guide layer was 33 parts by weight Ebecryl 3700, 17 parts by weight Ebecryl 1830, 30 parts TMPTA, 20 parts HDDA, 1.8 parts Darocur 1173 and 0.2 parts benzophenone. The final very thin cladding layer was formed from the formulation described in example 8. FIG. 9 shows how the thickness of the first cladding layer formulation of this example varies with spinning speed in a spin coater after 10 seconds spinning at 500 rpm and 20 seconds spinning at the indicated speed. FIG. 10 shows how the thickness of the guide layer formulation of this example varies with spinning speed in a spin coater after 10 seconds spinning at 500 rpm and 20 seconds spinning at the indicated speed. FIGS. 11, 12 and 13 show how the viscosity of the first cladding and guide formulation of Example 9 and the final cladding formulation of Example 8 varies with temperature.

Photo-initiators useful in curing the compositions of the invention with ultra-violet light are well known. They are selected from those aromatic ketones which do not absorb in the wavelengths ranges which these optical waveguide structures transmit. Suitable photo-initiators include benzoin ethers such as the methyl, ethyl, isopropyl, and isobutyl ether; α-acryloxime esters such as 1-phenyl-1,2-propanedione-2-(O-ethoxycarbonyl) oxime; benzil ketals such as 2,2-dimethoxy-2-phenyl-acetophenone, benzil and hydroxy cyclohexyl phenyl ketone; acetophenones such as diethoxyacetophenone and 2-hydroxy-2-methyl-1-phenyl-propan-1-one; and ketones such as benzophenone, chlorothioxanthone, 2-chlorothioxanthane, isopropyl thioxanthane, 2-methylthioxanthone, and substituted benzophenones containing halogen (chlorine) and alkyl substituents.

To those skilled in the art to which the present invention pertains, many widely differing embodiments will be suggested by the foregoing without departing from the spirit and scope of the present invention. The descriptions and disclosures herein are intended solely for purposes of illustration and should not be construed as limiting the scope of the present invention which is more particularly pointed out by the following claims.

What is claimed is:

1. A method of forming a multilayer polymer assembly which comprises the steps of:
    (a) forming on at least part of a surface of a substrate a first layer comprising at least one ethylenically unsaturated monomer;
    (b) curing the monomer containing layer to form a first polymeric layer having a first $T_g$ (glass transition temperature);
    (c) heating the assembly to a temperature above the $T_g$ of the first layer for a period of at least 15 seconds; and
    (d) further curing the assembly.

2. A method of forming a multilayer polymer assembly as set forth in claim 1 which further comprises, after step (c) but prior to step (d), the step of forming, on the cured first layer, a second layer comprising at least one second ethylenically unsaturated monomer, which may independently be the same as or different from the first monomer, and whereby step (d) also cures the second layer to form a second polymer layer having a second $T_g$.

3. A method of forming a multilayer polymer assembly as set forth in claim 1 which further comprises, after step (d), the steps of forming, on the cured first polymeric layer, a second layer comprising at least one second ethylenically unsaturated monomer, which may be the same as or different from the first monomer; and then curing the second layer to form a second polymeric layer having a second $T_g$.

4. A method of forming a multilayer polymer assembly as set forth in claim 1 which further comprises, after step (b), but before step (c), the steps of forming, on the cured first polymeric layer, a second layer comprising at least one second ethylenically unsaturated monomer, which may be the same as or different from the first monomer; and then curing the second layer to form a second polymeric layer having a second $T_g$, and wherein step (c) comprises heating the assembly to a temperature above the highest $T_g$ of all the polymer layers then formed, but not previously heated to above their $T_g$, for a period of at least 15 seconds.

5. A method according to claim 1 in which the first and second polymeric layers are formed on a surface of a substrate, which surface comprises at least one polymeric layer already formed from a cured composition comprising an ethylenically unsaturated monomer.

6. A method according to claim 5 wherein the already formed polymeric layer is a film of cured primer less than 5 μm thick securely adhered to the substrate.

7. A method according to claim 1 wherein, after all polymeric layers of the assembly have been formed, the assembly is heated to a temperature above the highest $T_g$ of all of the layers then formed, but not previously heated to above their $T_g$, for a period of at least 15 seconds and then further cured.

8. A method according to claim 1 wherein, after all polymer layers except the final layer of the assembly have been formed, the assembly is heated to a temperature above the highest $T_g$ of all of the layers then formed, but not previously heated to above their $T_g$, for a period of at least 15 seconds and then further cured.

9. A method according to claim 1 in which radiation is used to carry out the curing steps.

10. A method according to claim 9 wherein the radiation is one of infra-red, ultra-violet or ionizing radiation.

11. A method according to claim 7 wherein radiation is used to carry out the curing steps.

12. A method according to claim 11 wherein the radiation is one of infra-red, ultra-violet or ionizing radiation.

13. A method according to claim 8 wherein radiation is used to carry out the curing steps.

14. A method according to claim 13 wherein the radiation is one of infra-red, ultra-violet or ionizing radiation.

15. A method according to claim 1 wherein each molecule of at least one of the first and the second ethylenically unsaturated monomers contains more than one unsaturated group.

16. A method according to claim 15 wherein each molecule of both of the first and the second ethylenically unsaturated monomers contains more than one unsaturated group.

17. A method according to claim 1 wherein the assembly comprises an optical waveguide structure.

* * * * *